W. A. STEELE.
AUXILIARY TIRE FOR WHEELS.
APPLICATION FILED OCT. 6, 1915.
1,200,255.
Patented Oct. 3, 1916.
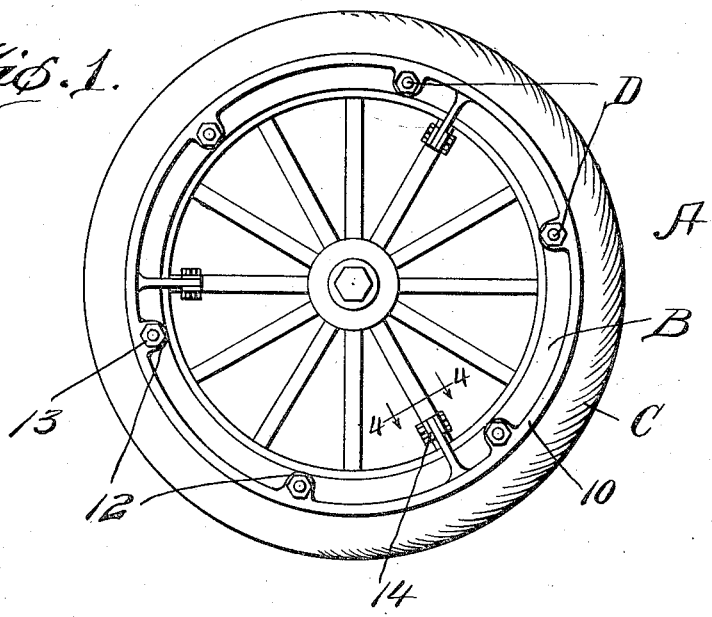
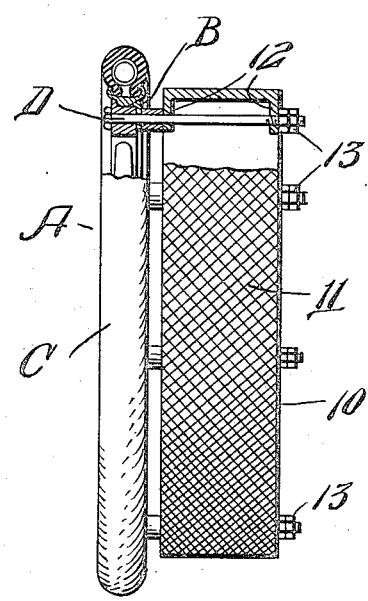
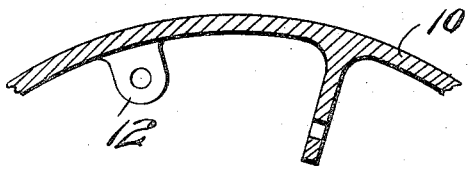
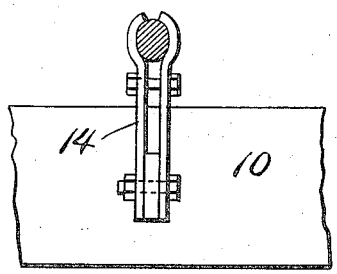
Inventor
W. A. Steele,
By David P. Moore.
Attorney
Witnesses

UNITED STATES PATENT OFFICE.

WILLIAM A. STEELE, OF LOS ANGELES, CALIFORNIA.

AUXILIARY TIRE FOR WHEELS.

1,200,255. Specification of Letters Patent. Patented Oct. 3, 1916.

Application filed October 6, 1915. Serial No. 54,388.

*To all whom it may concern:*

Be it known that I, WILLIAM A. STEELE, a citizen of the United States of America, residing at Los Angeles, in the county of Los Angeles and State of California, have invented certain new and useful Improvements in Auxiliary Tires for Wheels, of which the following is a specification.

The invention relates to tires for vehicle wheels, and more particularly to the class of detachable auxiliary tires for traction wheels.

The primary object of the invention is the provision of a tire of this character, wherein the same can be conveniently attached to or removed from a traction wheel with despatch, and when in use will enable a vehicle, automobile, wheel barrow, or the like wheel to travel freely through sand, mud or soft earth, without resultant sticking thereof, which necessitates the jacking of the wheel to liberate the same.

Another object of the invention is the provision of an auxiliary tire of this character, which is novel in construction, to afford a broad or wide tread to the wheel of a vehicle, automobile, bicycle, wheel barrow, or the like, for the sure travel thereof in sand, mud or wet or soft surfaces.

A further object of the invention is the provision of a tire of this character, wherein the mounting of the same upon a wheel can be executed in a ready and easy manner, without undue labor on the part of the user.

A still further object of the invention is the provision of a tire of this character, which is simple in construction, thoroughly reliable and efficient in operation, strong, durable, and inexpensive in manufacture.

With these and other objects in view, the invention consists in the features of construction, combination and arrangement of parts as will be hereinafter fully described, illustrated in the accompanying drawings, and pointed out in the claim hereunto appended.

In the accompanying drawings: Figure 1, is a side elevation of an auxiliary wheel or tire constructed in accordance with the invention. Fig. 2, is a front elevation, partly in section. Fig. 3, is an enlarged fragmentary vertical longitudinal sectional view. Fig. 4, is an enlarged sectional view taken on line 4—4 of Fig. 1.

Similar reference characters indicate corresponding parts throughout the several views in the drawings.

Referring to the drawings, in detail, A, designates generally a vehicle wheel, having the usual quick-detachable and demountable rim B, carrying the pneumatic tire C, of the ordinary well known construction, the rim B, being fastened upon the felly of the wheel A, through the medium of a series of bolts D, as usual which are spaced at intervals apart and pass transversely through the rim and felly, respectively, and are of considerably greater length than the ordinary bolts employed for this purpose, to permit the attachment of the auxiliary tire, hereinafter fully described.

The auxiliary tire comprises an annulus 10, of any desired width, preferably made from steel or iron, although it may be made from any other suitable durable material, having its outer surface serrated or roughened as at 11, to provide an anti-skidding tread thereto, while formed on opposite side edges and at the inner periphery of said annulus are perforated ears 12, which are arranged in companion pairs at intervals throughout the circumference of the annulus to receive the extended bolts D, which project beyond the outer side of the felly of the wheel, and have threaded thereon jam nuts 13, which serve to fasten the annulus thereon in spaced relation to the felly of the wheel. The annulus 10, is of the same diameter as the felly of the wheel, so that in event the tire thereon sinks into sand or mud, the annulus will limit the sinking of the wheel and permit the latter to travel freely through the sand or mud. Augmenting the bolts D, are suitable clamps 14, which are carried upon the inner periphery of the annulus 10, and are adapted to engage the spokes of the wheel A, so as to securely fasten the said annulus thereon, whereby it will serve as an auxiliary tire for the wheel when traveling through sand, mud, soft earth or over slippery surfaces.

From the foregoing it is thought that the construction and manner of operation of the auxiliary tire will be clearly understood, and therefore, a more extended explanation has been omitted.

What is claimed is:—

The combination with a wheel, of an auxiliary tire, comprising a broad tread annulus, pairs of opposite perforated ears arranged at intervals on the inner periphery of the annulus, single perforated ears on the inner periphery of the annulus at points between the pairs of ears and at right angles thereto, bolt members passed through the pairs of ears and engaged in the felly of the wheel, and two-part adjustable clamping members bolted to the single ears and detachably embracing the spokes of the wheel.

In testimony whereof I affix my signature in the presence of two witnesses.

WILLIAM A. STEELE.

Witnesses:
P. S. RISHEL,
EDITH AYLIN.